United States Patent Office 3,636,045
Patented Jan. 18, 1972

3,636,045
THIEPINO AND OXEPINO[4,5-c]PYRROL DERIVATIVES
Hans Blattner and Walter Schindler, Riehen, Switzerland, assignors to Geigy Chemical Corporation, Ardsley, N.Y.
No Drawing. Filed Nov. 19, 1969, Ser. No. 878,175
Claims priority, application Switzerland, Nov. 27, 1968, 17,644/68
Int. Cl. C07d 27/36
U.S. Cl. 260—326.5 — 7 Claims

ABSTRACT OF THE DISCLOSURE

Substituted 2,3 - dihydro-1H-dibenzo[2,3:6,7]thiepino [4,5-c]pyrrols, the corresponding oxepino derivatives and the pharmaceutically acceptabe acid addition salts thereof have a central nervous system depressant effect; the compounds can be prepared by reacting 10,11-bis-bromomethyldibenzo[b,f]thiepins or the corresponding oxepins with primary amines; the pyrrols and the pharmaceutically acceptable acid addition salts thereof are the active ingredients of pharmaceutical compositions; an illustrative embodiment is 2-ethyl - 2,3 - dihydro-1H-dibenzo- [2,3:6,7]thiepino[4,5-c]pyrrol.

The present invention relates to new thiepin and oxepin derivatives, processes for the production thereof, medicaments containing the new compounds and their use.

More particularly, the present invention relates to compounds of Formula I,

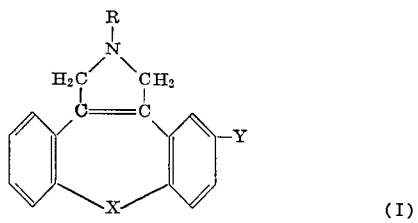

(I)

wherein

X is oxygen or sulfur,
Y is hydrogen, chloro, methyl, methoxy or methylthio, and
R is hydrogen, straight chain lower alkyl having 1 to 6 carbon atoms, isopropyl or allyl;

and the pharmaceutically acceptable acid addition salts thereof.

A preferred class are compounds of Formula I wherein R is straight chain lower alkyl having 1 to 4 carbon atoms and the pharmaceutically acceptable acid addition salts thereof.

Preferred members are:

2-methyl-2,3-dihydro-1H-dibenzo[2,3:6,7]thiepino- [4,5-c]pyrrol;
2-ethyl-2,3-dihydro-1H-dibenzo[2,3:6,7]thiepino[4,5-c] pyrrol;
2-methyl-5-methoxy-2,3-dihydro-1H-dibenzo[2,3:6,7] thiepino[4,5-c]pyrrol;
2-ethyl-5-methoxy-2,3-dihydro-1H-dibenzo[2,3:6,7] thiepino[4,5-c]pyrrol;
2-ethyl-5-methylthio-2,3-dihydro-1H-dibenzo[2,3:6,7] thiepino[4,5-c]pyrrol, and the pharmaceutically acceptable acid addition salts thereof.

The compounds of the invention have been found to have valuable pharmacological properties, in particular, they have been found to have a depressant action on the central nervous system of mammals on oral, rectal or parenteral administration. These properties, in combination with a high therapeutic index render the compounds of the invention suitable as active ingredients of pharmaceutical compositions which can be used for the treatment of states of tension and agitation.

According to the present invention, compounds of Formula I are produced by reacting a compound of Formula II

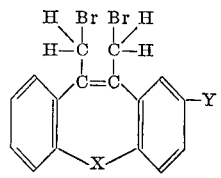

(II)

wherein X and Y have the meanings given under Formula I, with an amine of Formula III

(III)

wherein R has the meaning given under Formula I, and optionally converting the obtained reaction product with an inorganic or organic acid into an acid addition salt.

The bis-bromomethyl compounds of Formula II are reacted with the free bases of Formula III in the presence of a solvent. Suitable solvents are those which are inert under the reaction conditions, e.g. hydrocarbons such as benzene or toluene, halogenated hydrocarbons such as chloroform, lower alkanols such as methanol or ethanol, ethereal liquids such as ether or dioxane, as well as lower alkanones such as acetone, methyl ethyl ketone or diethyl ketone.

In the reaction, according to the invention, of one molar equivalent of a bis-bromomethyl compound with one molar equivalent of a free base, two molar equivalents of hydrogen bromide are split off. The hydrogen bromide is preferably bound by excess base of Formula III.

One of the starting materials, e.g. 2-methoxy-10,11-bis-bromomethyl-dibenzo[b,f]thiepin, embraced by Formula II, can be produced by the following process:

The starting compound is 8 - methoxy - dibenzo[b,f] thiepin-10(11H) - one (cp. Spofa, French patent specification No. 1,484,332) which, with methyl iodide in the presence of sodium amide, yields the 8-methoxy-11-methyl-dibenzo[b,f]thiepin-10(11H) - one. This intermediate product is reacted with the Grignard reagent prepared from methyl iodide and magnesium to give the 8-methoxy-10,11 - dimethyl - 10,11 - dihydrodibenzo[b,f]thiepin-10-ol which, after boiling with dilute hydrochloric acid and then with potassium hydroxide is converted, with the splitting off of water, into the 2-methoxy-10,11-dimethyl-dibenzo[b,f]thiepin. The obtained dimethyl compound is finally brominated with N-bromosuccinimide in the presence of dibenzoyl-peroxide. Further thiepin or oxepin derivatives of Formula II can be produced analogously to the above process, e.g. the 10,11-bis-bromomethyl - dibenzo[b,f]thiepin is produced by bromination of 10,11-dimethyl - dibenzo[b,f]thiepin [cp. M. M. Urberg and E. T. Kaiser, J. Am. Chem. Soc. 89, 5931 (1967)]. Also, the 2 - chloro - 10,11 - bis - bromomethyldibenzo[b,f] thiepin can be produced, starting with 8-chlorodibenzo [b,f]thiepin-10(11H)-one. (cp. Geigy D.A.S. No. 1,228,- 272) by way of the intermediates 8-chloro-10,11-dimethyl-10,11-dihydro-dibenzo[b,f]thiepin-10-ol and 2-chloro-10,11-dimethyldibenzo[b,f]thiepin. Similarly can be produced 10,11-bis-bromomethyl-dibenz[b,f]oxepin, starting with dibenz[b,f]oxepin - 10(11H) - one [cp. R. H. F. Manske and A. E. Ledingham, J. Am. Chem. Soc. 72, 4797 (1950)] by way of the intermediates 11-methyl-dibenz[b,f]oxepin-10(11H)-one, 10,11-dimethyl-10,11 - dihydro-dibenz[b,f]oxepin-10-ol and 10,11-dimethyl-dibenz[b,f]oxepin.

Compounds of Formula I in which R is hydrogen can be prepared by a second process which comprises hydrolysing a compound of Formula IV

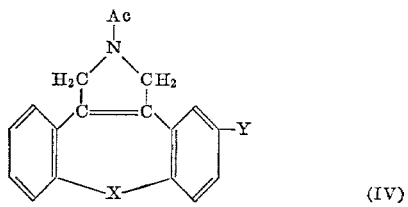

(IV)

wherein

X and Y have the meanings given under Formula I, and Ac is the acyl group of an organic acid, and if desired, converting a compound of Formula I thus obtained into an acid addition salt with an inorganic or organic acid.

In the starting material of Formula IV, Ac is particularly the acyl group of cyanic acid, chloroformic acid, a carbonic acid or thiocarbonic acid monoester, a lower alkanoic or an arene carboxylic acid. Examples of acyl groups Ac are the cyano-, chlorocarbonyl-, methoxycarbonyl-, ethoxycarbonyl-, tert.butoxycarbonyl-, phenoxycarbonyl-, benzyloxycarbonyl-, methoxythiocarbonyl, methylthiothiocarbonyl-, acetyl- and the benzoyl group.

The hydrolysis of compounds of Formula IV is carried out, for example, by heating such compounds for several hours in an alkanolic or aqueous/alkanolic solution of an alkali metal hydroxide. For example by boiling in a mixture of potassium or sodium hydroxide with ethanol or methanol and a little water. Instead of alkanols other solvents containing a hydroxy group may be used such as ethylene glycol and monoalkylethers thereof. Furthermore, compounds of Formula IV, in particular those in which Ac is the acyl group of cyanic acid, can be hydrolysed by heating with a mineral acid in an organic/aqueous or aqueous medium for example by boiling for several hours in a mixture of 85% phosphoric acid and formic acid or by heating for several hours in 48% hydrobromic acid at 60–70°.

Starting materials of Formula IV are prepared, for example, by reacting a compound of Formula V

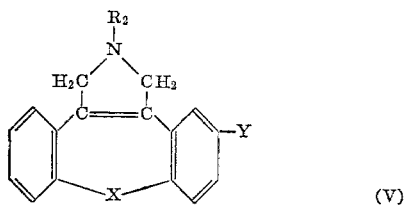

(V)

wherein

X and Y have the meanings given under Formula I, and R₂ is lower alkyl, allyl or benzyl with an organic acylhalide, for example a cyanohalide, in particular, a cyanogenbromide, or also with phosgene, a chloroformic acidphenylester or -benzylester, the chloride or bromide of a lower alkanoic acid or benzoic acid, particularly acetylchloride, acetylbromide or benzoylchloride, at room temperature or at raised temperature, whereby according to the Von Braun-reaction the desired acylation occurs with the splitting off of the group R₂. The reaction is carried out in an inert organic solvent such as, for example, chloroform or benzene or, if desired, also in an excess of an acylhalide suitable as reaction medium.

The starting material of Formula V is in its turn prepared analogously to the first process, by reacting a compound of Formula II with an amine of Formula VI

(VI)

wherein

R₂ is lower alkyl, allyl or benzyl.

The compounds of Formula I may optionally be converted, in the usual manner, into their pharmaceutically acceptable acid addition salts with inorganic and organic acids. For example, the acid desired as salt component, or a solution of the acid, is added to a solution of a compound of Formula I in an organic solvent. For the reaction, it is preferable to use organic solvents, in which the salt formed is not readily soluble, so that it can be separated by filtration. Such solvents are, e.g. methanol, acetone, methyl ethyl ketone, acetone/ethanol, methanol/ether or ethanol/ether.

Pharmaceutically acceptable acid addition salts are derived from such acids, the anions of which are non-toxic at the required dosage levels. Furthermore, it is of advantage if the salts to be used as medicaments readily crystallise and are not, or are only slightly hygroscopic. For salt formation with compounds of Formula I, it is possible to use, e.g. hydrochloric acid, hydrobromic acid, sulfuric acid, phosphoric acid, methanesulfonic acid, ethanesulfonic acid, ethanesulfonic acid, β-hydroxyethanesulfonic acid, acetic acid, maleic acid, tartaric acid, citirc acid, lactic acid, oxalic acid, succinic acid, fumaric acid, maleic acid, benzoic acid, salicylic acid, phenylacetic acid, mandelic acid and embonic acid.

The depressant effect of the compounds of the invention on the central nervous system is demonstrated in a variety of standard animal tests [cp. R. Domenjoz and W. Theobald et al., Arch. int. Pharmacodyn. 120, 450 (1959), G. Raymond, Produits Pharm. 16, 99, (1961) and W. Theobald and R. Domenjoz, Arzneimittelforschung 8, 18 (1958)]. In particular, it is demonstrated that the compounds of Formula I and the pharmaceutically acceptable acid addition salts thereof on oral, rectal or parenteral administration in amounts of from about 0.1 to about 20 mg./kg. to such test animals as mice and rats reduce motility, potentiate the action of analgesics and anesthetics, counteract the effect of amphetamine, exhibit a positive action in the "test de la traction," have an antiemtic, serotonin-antagonistic action and lower the body temperature. Also an antihistamic effect can be observed. The toxicity of the compounds of the invention is of favorable low order.

For their intended use in mammals, the compounds of the invention are administered in daily dosages of between 0.1 mg./kg. and 10 mg./kg. The exact dosages depend of course on the species, age and weight of the individuum under treatment as well as on the particular condition being treated and the form of administration.

Suitable dosage units such as dragées, tablets, suppositories or ampoules, preferably contain 5–200 mg. of an active substance, according to the invention, or of a pharmaceutically acceptable salt thereof.

Dosage units for oral administration preferably contain as active substance between 1 and 90% of a compound of Formula I or of a pharmaceutically acceptable salt thereof. They are produced by combining the active substance with, e.g. solid, pulverulent carriers such as lactose, saccharose, sorbitol, or mannitol; starches such as potato starch, maize starch or amylopectin, also laminaria powder or citrus pulp powder; cellulose derivatives or gelatine, optionally with the addition of lubricants such as magnesium stearate or calcium stearate or polyethylene glycols, to form tablets or dragée cores. The dragée cores are coated, e.g. with concentrated sugar solutions, which can also contain, e.g. gum arabic, talcum and/or titanium dioxide or with a lacquer dissolved in easily volatile organic solvents or mixtures of solvents. Dyestuffs can be added to these coatings, e.g. to distinguish between varying dosages of active substance.

Other suitable dosage units or oral administration are hard gelatine capsules as well as soft, closed capsules made from gelatine and a softener such as glycerin. The hard capsules preferably contain the active substance as a granulate, e.g. in admiixture with fillers such as maize starch, and/or lubricants such as talcum, or magnesium stearate and, optionally, stabilisers such as sodium metabisulphite ($NaSO_5$) or ascorbic acid. In soft capsules, the active substance is preferably dissolved or suspended in suitable liquids such as liquid polyethylene glycols, whereby stabilisers can also be added.

Suitable dosage units for rectal administration are, e.g. suppositories consisting of a combination of an active substance, or of a suitable salt thereof, with a fatty foundation substance. Also suitable are gelatine rectal capsules containing a combination of the active substance, or a suitable salt thereof with polyethylene glycol.

Ampoules for parenteral, especially intramuscular administration, preferably contain a water-soluble salt of an active substance in a concentration of preferably 0.5 to 5%, optionally together with suitable stabilising agents buffer substances, in aqueous solution.

The following examples further illustrate the nature of the present invention but they should not be construed as a limitation of the scope thereof. The temperatures are given in degrees centigrade.

EXAMPLE 1

(a) 25.0 g. of 10,11 - bis - bromomethyl - dibenzo [b,f]thiopin are dissolved in 150 ml. of anhydrous benzene. This solution is added dropwise within one hour at 40° to a solution of 75.0 g. of methylamine in 425 ml. of methanol. The reaction mixture is stirred for a further two hours at 50° and the solvent and the excess methylamine are then distilled off. 100 ml. of water are added to the residue and a suspension is obtained which is extracted with ether. The ethereal solution is washed with water, dried over potassium carbonate and concentrated by evaporation. The residue, which is recrystallised from ethanol, yields 2 - methyl - 2,3 - dihydro - 1H - dibenzo [2,3:6,7]thiepino[4,5-c]pyrrol, M.P. 109–110°.

12.5 g. of the obtained base are dissolved in 25 ml. of anhydrous acetone and 4.5 g. of methane-sulphonic acid are carefully added, whereupon the methanesulphonic crystallises. After recrystallisation from anhydrous ethanol, the methane-sulphonate melts at 238–243°.

The starting material, i.e. the 10,11-bis-bromomethyl-dibenzo[b,f]thiepin, is produced as follows:

(b) 38.5 g. of 10,11-dimethyl-dibenzo[b,f]thiepin [cp. M. M. Urberg and E. T. Kaiser, J. Am. Chem. Soc. 89, 5931 (1967)] are dissolved in 385 ml. of carbon tetrachloride. To this solution are added 58.0 g. of N-bromosuccinimide and 1.1 g. of dibenzoylperoxide. By exposure to two 200-watt lamps or to a UV-lamp, the mixture is heated, while stirring, to boiling. The mixture is kept boiling until all the N-bromosuccinimide, lying on the bottom of the vessel, has been converted into succinimide which separates out as an upper phase. The reaction mixture is then cooled to 20° and the succinimide is separated by filtration. The filtrate is washed with water, dried over sodium sulphate and completely concentrated by evaporation in a rotary evaporator. The residue, which is recrystallised from benzene, yields 10,11-bis-bromomethyl-dibenzo [b,f]thiepin, M.P. 150–151°.

EXAMPLE 2

The following end products are produced analogously to Example 1(a):

(a) From 20.0 g. of 10,11-bis-bromomethyl-dibenzo [b,f]thiepin and 17.5 g. of ethylamine in 100 ml. of methanol is produced 2-ethyl-2,3-dihydro-1H-dibenzo[2,3:6,7] thiepino[4,5-c]pyrrol, M.P. 83–85° (from petroleum ether); methanesulphonate, M.P. 220–223° (from anhydrous ethanol), and (b) From 20.0 g. of 10,11-bis-bromomethyl-dibenzo [b,f]thiepin and 33.0 g. of butylamine in 150 ml. of methanol is obtained 2 - butyl - 2,3 - dihydro - 1H - dibenzo[2,3:6,7]thiepino[4,5-c]pyrrol, M.P. 69–70° (from petroleum ether; the free base is converted with ethanolic hydrochloric acid into the hydrochloride, M.P. 220–224° (from anhydrous ethanol/anhydrous ether).

(c) From 13.2 g. of 10,11-bromomethyl-dibenzo [b,f]thiepin and 30.3 g. of hexylamine in 100 ml. of methanol is produced 2 - hexyl - 2,3 - dihydro - 1H - dibenzo[2,3:6,7]thiepino[4,5-c]pyrrol, crude product; methanesulphonate, M.P. 185–187° C. (from acetone);

(d) From 13.2 g. of 10,11 bis-bromomethyl-dibenzo [b,f]thiepin and 19.7 g. of isopropylamine in 100 ml. of methanol is produced 2-isopropyl-2,3-dihydro-1H-dibenzo [2,3:6,7]thiepino[4,5-c]pyrrol, crude product; methanesulphonate, M.P. 282–284° (from anhydrous ethanol).

(e) From 20.0 g. of 10,11-bis-bromomethyl-dibenzo [b,f]thiepin and 28.5 g. of allylamine in 100 ml. of methanol is produced 2-allyl-2,3-dihydro-1H-dibenzo [2,3:6,7]thiepino[4,5-c]pyrrol crude product; methanesulphonate, M.P. 255–258° C. (from anhydrous ethanol).

EXAMPLE 3

(a) 21.5 g. of 2-chloro-10,11-bis-bromomethyldibenzo [b,f]thiepin are dissolved in 100 ml. of absolute benzene and added dropwise at 40°, within one hour, to a solution of 35.0 g. of methylamine in 200 ml. of methanol. The reaction mixture is stirred for a further two hours at 50° and the solvent and the excess methylamine are subsequently distilled off. 100 ml. of water are added to the residue and the obtained suspension is extracted with ether. The ethereal solution is washed with water, dried over potassium carbonate and concentrated by evaporation. The residue, which is recrystallised from ethanol, yields 2-methyl - 5 - chloro - 2,3 - dihydro - 1H - dibenzo[2,3:6,7] thiepino[4,5-c]pyrrol, M.P. 123–124°.

The obtained base is converted with methanesulphonic acid into the methanesulphonate, M.P. 251–254° (from anhydrous ethanol).

The starting material, i.e. the 2-chloro-10,11-bis-bromomethyl-dibenzo[b,f]thiepin, is produced as follows:

(b) A solution of 37.0 g. of 8-chloro-11-methyldibenzo [b,f]thiepin-10(11H)-one, M.P. 113° (cp. Geigy D.A.S. 1,228,272), in 80 ml. of benzene is added dropwise within one hour, while stirring well, to a Grignard solution prepared from 6.6 of magnesium, 38.5 g. of methyl iodide and 70 ml. of ether, while a reaction temperature of −5 to 0° is maintained. The reaction mixture is subsequently heated to 45° and is further stirred for 15 hours at this temperature. The mixture is then cooled to 0° and is stirred into a solution of 85.0 g. of ammonium chloride in 250 ml. of ice water. The organic phase is separated and the aqueous phase extracted with benzene. The combined organic solutions are washed with water, dried over sodium sulphate and concentrated by evaporation in vacuo. As residue is obtained 8-chloro-10,11-dimethyl-10,11-dihydro-dibenzo[b,f]thiepin-10-ol (crude product) in the form of a yellowish-brown oil.

(c) 39.0 g. of the hydroxy compound, obtained according to (b), are refluxed for 10 hours, while stirring, in 200 ml. of 4 N hydrochloric acid. The mixture is cooled to 20°, extracted with ether, the organic phase washed with water, dried over potassium carbonate and concentrated by evaporation. The residue is dissolved in 200 ml. of anhydrous ethanol, 40.0 g. of potassium hydroxide are added to this solution and the mixture is then refluxed for 5 hours. The reaction mixture is poured into water and extracted with ether. The organic phase is washed with water, dried over potassium carbonate and concentrated by evaporation. The residue, 2-chloro-10,11-dimethyldibenzo[b,f]thiepin, melts after recrystallisation from ether/petroleum ether at 99–102°.

(d) 26.0 g. of the thiepin, obtained according to (c), are dissolved in 260 ml. of carbon tetrachloride and to this soltuion are added 34.5 g. of N-bromosuccinimide and 0.6 g. of dibenzoylperoxide. The mixture is brought to boiling, while stirring, by exposure to two 200-watt lamps or to a UV-lamp. The mixture is kept boiling until all the N-bromosuccinimide, lying on the bottom of the vessel, has been converted into succinimide which separates on an upper phase. The reaction mixture is thereupon cooled to 20° and the succinimide separated by filtration. The filtrate is washed with water, dried over sodium sulphate and completely concentrated by evaporation in a rotary evaporator. The residue, which is recrystallised from benzene, yields 2-chloro-10,11-bis-bromomethyldibenzo[b,f]thienpin, M.P. 131–133°.

EXAMPLE 4

From 14.0 g. of 2-chloro-10,11-bis-bromomethyldibenzo[b,f]thiepin and 23.0 g. of ethylamine in 140 ml. of methanol is produced, analogously to Example 3(a), 2-ethyl-5-chloro-2,3-dihydro - 1H - dibenzo[2,3:6,7]thiepino[4,5-c]pyrrol, M.P. 71–74° (from petroleum/ether); yield 8.0 g., 80% of theoretical value; methanesulphonate, M.P. 261–264° (from absolute ethanol).

(b) From 20 g. 2-chloro-10,11-bis-bromomethyl-dibenzo[b,f]thiepin and 26 g. of allylamine in 90 ml. of methanol is produced 2-allyl-5-chloro-2,3-dihydro-1H-dibenzo[2,3:6,7]thiepino[4,5-c]pyrrol, crude product; methane-sulphonate, M.P. 235–237° (from anhydrous ethanol).

EXAMPLE 5

(a) 21.3 g. of 2-methoxy-10,11-bis-bromomethyldibenzo[b,f]thiepin are dissolved in 200 ml. of anhydrous benzene and added dropwise, within one hour at 40°, to a solution of 35.0 g. of methylamine in 200 ml. of methanol. The reaction mixture is stirred for a further two hours at 50° and the solvent and the excess methylamine are subsequently distilled off. 100 ml. of water are added to the residue and the obtained suspension is extracted with ether. The ethereal solution is washed with water, dried over potassium carbonate and concentrated by evaporation. The residue, which is recrystallised from petrol yields 2-methyl-5-methoxy-2,3-dihydro-1H-dibenzo[2,3:6,7]thiepino[4,5-c]pyrrol, M.P. 127–129°.

The obtained base is converted with methanesulphonic acid into the methanesulphonate, M.P. 223–226° (from anhydrous ethanol).

The starting material, 2-methoxy-10,11-bis-bromomethyl-dibenzo[b,f]thiepin, is produced as follows:

(b) A suspension of 13.5 g. of sodium amide in 35 ml. of anhydrous toluene is added dropwise at 50–60° over a period of 30 minutes to a solution of 80.0 g. of 8-methoxy-dibenzo[b,f]thiepin-10(11H)-one, M.P. 97–98° (cp. Spofa, French patent specification No. 1,484,332), in 800 ml. of anhydrous benzene and the mixture is then refluxed for two hours. The obtained suspension is cooled to 45° and, over a period of one hour, 54.5 g. of methyl iodide are added dropwise, while the temperature is maintained between 40° and 45°. The reaction mixture is stirred for 14 hours at this temperature and a further 20.0 g. of methyl iodide are added. The mixture is further stirred for 24 hours at 55–60° and subsequently refluxed for 24 hours. The suspension is then ocoled to 10° and 150 ml. of water are added dropwise. The organic phase is separated, washed with water, dried over sodium sulphate and completely concentrated by evaporation in a rotary evaporator. The residue, which is recrystallised from petrol, yields 8-methoxy-11-methyl-dibenzo[b,f]thiepin-10(11H)-one, M.P. 105–107°;

(c) The ketone, obtained according to (b), is subsequently converted, analogously to Example 3(b)–(d), into the following intermediate products:

(c¹) 8-methoxy-10,11-dimethyl - 10,11 - dihydro - dibenzo [b,f]thiepin-10-ol, M.P. 143–146° (from ethyl acetate);
(c²) 8 - methoxy - 10,11 - dimethyl - dibenzo[b,f]thiepin (crude product);
(c³) 8-methoxy-10,11 - bis - bromomethyl - dibenzo[b,f] thiepin, M.P. 118–120° (from petrol).

EXAMPLE 6

(a) From 11.0 g. of 2-methoxy-10,11-bis-bromomethyl-dibenzo[b,f]thiepin and 22.0 g. of ethylamine in 130 ml. of methanol, 2-ethyl-5-methoxy-2,3-dihydro-1H-dibenzo [2,3:6,7]thiepino[4,5-c]pyrrol (crude product) is produced analogously to example 5a); methanesulphonate, M.P. 209–213° (from isopropyl-ethanol);

(b) Similarly from 21 g. of 2-methoxy-10,11-bis-bromomethyldibenzo[b,f]thiepin and 28.5 g. of allylamine in 100 ml. of methanol 2-allyl-5-methoxy-2,3-dihydro-1H-dibenzo[2,3:6,7]thiepino[4,5-c]pyrrol, (crude product) is produced.

EXAMPLE 7

(a) 15 g. of 2-methyl-10,11-bis-bromomethyl-dibenzo [b,f]thiepin are dissolved in 50 ml. of anhydrous benzene and added dropwise at 40° and within one hour, to a solution of 22 g. of methylamine in 130 ml. of methanol. The reaction mixture is then stirred for a further two hours at 50° and the solvent and the excess methylamine subsequently distilled off. The residue is mixed with 70 ml. of water and the suspension thus obtained is extracted with ether. The ethereal solution is washed with water, dried over potassium carbonate and evaporated. The residue, 2,5 - dimethyl - 2,3 - dihydro-1H-dibenzo[2,3:6,7]thiepino [4,5-c]pyrrol is a viscous oil; 9 g. of the crude base obtained are dissolved in 40 ml. of anhydrous acetone and 3.1 g. of methane sulphonic acid are cautiously added to the solution, whereupon the methane sulphonate crystallises, which, after recrystallisation from isopropanol, melts at 240–242°.

The starting material, 2-methyl-10,11bis-bromomethyl-dibenzo[b,f]thiepin is prepared as follows:

(b) A suspension of 33.5 g. of sodium amide in 91 ml. of anhydrous toluene is added dropwise at 50–60° and within 30 minutes, to a solution of 180 of 8-methyl-dibenzo [b,f]thiepin-10(11H)-one, M.P. 68–69° (Spofa, French Pat. No. 1,484,332) in 1750 ml. of anhydrous benzene and the mixture is then boiled under reflux for two hours. The suspension thus obtained is cooled to 45° and 169 g. of methyl iodide are added dropwise within one hour during which time the temperature is maintained between 40 and 45°. The reaction mixture is then stirred for 14 hours at this temperature and a further 60 g. of methyl iodide are then added. This mixture is then stirred for 24 hours at 55–60° and for a further 24 hours under reflux. The suspension is then cooled to 10° and 400 ml. of water are added dropwise. The organic phase is separated, washed with water, dried over sodium sulphate and completely evaporated in a rotary evaporator. The residue, which is recrystallised from methanol, produces 8-11-dimethyl-dibenzo[b,f]thiepin-10(11H)-one, M.P. 80–82°.

(c) The ketone obtained from (b) is converted into the following intermediate products analogously to example 3(b)–(d):

(c¹) 8,10,11 - trimethyl-10,11-dihydrodibenzo[b,f]thiepin-10-ol, crude product;
(c²) 2,10,11-trimethyl-dibenzo[b,f]thiepin, M.P. 87–88° (from methanol);
(c³) 2-methyl-10,11-bis-bromomethyl-dibenzo[b,f]thiepin, M.P. 122–124° (from cyclohexane).

EXAMPLE 8

Analogously to Example 7(a) are prepared:

(a) From 15 g. of 2-methyl 10,11-bis-bromomethyldibenzo[b,f]thiepin and 33 g. of ethylamine in 145 ml. of methanol, 2 - ethyl-5-methyl-2,3-dihydro-1H-dibenzo[2,3: 6,7]thiepino[4,5-c]pyrrol, crude product; methanesulphonate M.P. 218–221° (from isopropanol).

(b) From 20.5 g. of 2-methyl-10,11-bis-bromomethyldibenzo[b,f]thiepin and 28.5 g. of allylamine in 100 ml. of methanol, 2 - allyl-5-methyl-2,3-dihydro-1H-dibenzo[2,3: 6,7]pyrrol, crude product, methanesulphonate, M.P. 223–225° (from anhydrous ethanol).

EXAMPLE 9

(a) 3.95 g. of 2-methylthio-10,11-bis-bromomethyl-dibenzo[b,f,]thiepin are dissolved in 20 ml. of anhydrous benzene and added dropwise at 40° and within half an hour to a solution of 10 g. of ethylamine in 65 ml. of methanol. The reaction mixture is stirred for a further 2 hours at 50° and the solvent and the excess ethylamine are subsequently distilled off. The residue is mixed with water and the obtained suspension is extracted with ether. The ethereal solution is washed with water, dried over potassium carbonate and concentrated to a small volume, whereupon 2 - ethyl-5-methylthio-2,3-dihydro-1H-dibenzo[2,3: 6,7]thiepino[4,5-c]pyrrol crystallises out, M.P. 111–113°, after recrystallisation from petrol; 1.9 g. of the obtained base are dissolved in 10 ml. of anhydrous acetone and 0.56 g. of methane sulfonic acid are added whereupon the methanesulphonate crystallises out, which, after recrystallisation from anhydrous ethanol melts at 215–218°.

(b) The starting material, 2-methylthio-10,11-bisbromomethyl-dibenzo[b,f]thiepin is prepared from 36 g. of 8 - methylthio - dibenzo[b,f]thiepin - 10(11H)-one (Spofa French Pat. No. 1,484,332) M.P. 88–90° through the following intermediates to Examples 5(b) and 3(b) to (d):

($b^1$) 8 - methylthio - 11 - methyl - dibenzo[b,f]thiepin-10 (11H)-one M.P. 111–113° (from ethyl acetate),
($b^2$) 8 - methylthio - 10,11-dimethyl-10,11-dihydrodibenzo [b,f]thiepin-10-ol, M.P. 115–117° (from ethanol),
($b^3$) 2 - methylthio - 10,11 - dimethyl-dibenzo[b,f]thiepin, B.P. 150°, 0.02 torr,
($b^4$) 2 - methylthio - 10,11-bis-bromomethyl-dibenzo[b,f] thiepin, M.P. 126–130°, crude product.

EXAMPLE 10

(a) 15 g. of 10,11-bis-bromomethyl-dibenz[b,f]oxepin are dissolved in benzene and then added dropwise at 40° and within one hour to a solution of 35.5 g. of ethylamine in 150 ml. of methanol. The reaction mixture is stirred for a further hour at 50° and the solvent and excess ethylamine are subsequently distilled off. The residue is mixed with water and the resulting suspension is extracted with ether. The ethereal solution is washed with water, dried over potassium carbonate and completely evaporated. The residue is dissolved in petroleum ether and cooled to 0°, whereupon 2-ethyl-2,3-dihydro-1H-dibenz[2,3:6,7]oxepino [4,5-c]pyrrol, M.P. 51–52°, crystallises out. 6.5 g. of the obtained base are dissolved in 25 ml. of absolute acetone and 2.38 g. of methanesulphonic acid are added, whereupon the methane-sulphonate crystallises out which, after recrystallisation from anhydrous ethanol melts at 181–184°.

(b) The starting material 10,11-bis-bromomethyl-dibenz[b,f]oxepin is prepared analogously to Examples 5(b) and 3(b)–(d) through the following intermediates starting with dibenzoxepin-10(11H)-one (R. H. F. Manske and A. E. Ledingham, J. Am. Chem. Soc. 72, 4797 (1950), M.P. 51–52°:

($b^1$) 11 - methyl - dibenz[b,f]oxepine-10(11H)-one, B.P. 156°, 0.01 torr;
($b^2$) 10,11-dimethyl-10,11-dihydro-dibenz[b,f]oxepin-10-ol, M.P. 96–98° (from pentane).
($b^3$) 10,11 - dimethyl-dibenz[b,f]oxepin, M.P. 59–60° (from pentane);
($b^4$) 10,11 - bis-bromomethyl-dibenz[b,f]oxepin, M.P. 110–112° (from diethylether).

EXAMPLE 11

Analogously to Example 10(a) is prepared:

(a) From 23.5 g. 10,11-bis-bromomethyl-dibenz[b,f] oxepin and 38.5 g. of methylamine in 230 ml. of methanol, 2 - methyl-2,3-dihydro-1H-dibenz[2,3:6,7]oxepino [4,5-c]pyrrol, M.P. 110–111° (from petroleum ether); methanesulphonate, M.P. 190–193° (from anhydrous ethanol).

EXAMPLE 12

Analogously to Example 10(a) is prepared:

(a) From 20.7 g. of 2-chloro-10,11-bis-bromomethyl-dibenz[b,f]oxepin and 31 g. of methylamine in 186 ml. of methanol, 2 - methyl - 5-chloro-2,3-dihydro-1H-dibenz[2,3:6,7]oxepino[4,5 - c]pyrrol, M.P. 104–106° (from acetone); methanesulphonate, M.P. 179–182° (from anhydrous ethanol).

(b) The starting material, 2-chloro-10,11-bis-bromomethyldibenz[b,f]oxepin is prepared analogously to Example 5(b) and 3(b)–(d) through the following intermediates starting with 8 - chloro-dibenz[b,f]oxepin-10-(11H)-one (Rhone-Poulenc, S.A. NE. 68.06854), M.P. 84°:

($b^1$) 8 - chloro - 11 - methyl-dibenz[b,f]oxepino - 10- (11H)-one, M.P. 55–58° (from methanol);
($b^2$) 8 - chloro - 10,11 - dimethyl - 10,11 - dihydro-dibenz[b,f]oxepin-10-ol, crude product;
($b^3$) 2 - chloro - 10,11 - dimethyl-dibenz[b,f]oxepine, M.P. 106–108° (from methanol); and
($b^4$) 2 - chloro - 10,11 - bis-bromomethyl-dibenz[b,f] oxepin, M.P. 113–120° (from cyclohexane).

EXAMPLE 13

Analogously to Example 12(a) is prepared:

From 20.7 g. of 2-chloro-10,11-bis-bromomethyl-dibenz[b,f]oxepin and 45 g. of ethylamine in 200 ml. of ethanol, 2 - ethyl - 5 - chloro-2,3-dihydro-1H-dibenz-[2,3:6,7]oxepino[4,5-c]pyrrol, M.P. 94–97° (from acetone); methanesulphonate, M.P. 189–192° (from anhydrous ethanol).

EXAMPLE 14

Analogously to Example 10(a) is prepared:

(a) From 26 g. of 2-methoxy-10,11-bis-bromomethyl-dibenz[b,f]oxepin and 57 g. of ethylamine in 250 ml. of methanol 2 - ethyl - 5 - methoxy-2,3-dihydro-1H-dibenz-[2,3:6,7]oxepino[4,5-c]pyrrol, crude product; yield 14 g.: methanesulphonate, M.P. 195–198° (from anhydrous ethanol).

(b) The starting material, 2 - methoxy - 10,11-bis-bromomethyl-dibenz[b,f]oxepin is prepared analogously to Examples 3(b)–(d) through the following intermediates starting with 2 - methoxy - 11 - methyl-dibenz[b,f] oxepin - 10(11H)-one, B.P. 163–165°/0.015 torr:

($b^1$) 2 - methoxy - 10,11 - dimethyl - 10,11 - dihydro-dibenz[b,f]oxepin-10-ol, crude product;
($b^2$) 2 - methoxy - 10,11 - dimethyl-dibenz[b,f]oxepin, B.P. 123–126°/0.06 torr; and
($b^3$) 2 - methoxy - 10,11 - bis-bromomethyl-dibenz[b,f] oxepin (crude product).

EXAMPLE 15

(a) 72 g. of 2-allyl-2,3-dihydro-1H-dibenzo[2,3:6,7] thiepino[4,5-c]pyrrol are dissolved in 525 ml. of anhydrous benzenes and heated to boiling with stirring. Within one hour a solution of 31 g. of ethyl-chloroformate in 525 ml. of anhydrous benzene is added dropwise, and the allyl chloride thus formed is simultaneously distilled off.

When the addition is completed, the mixture is boiled under reflux for a further hour and then cooled to room temperature. The benzene solution is washed with 2-N hydrochloric acid and then with water, dried over sodium sulphate and concentrated to a small volume in vacuo whereupon 2 - carbethoxy - 2,3 - dihydro-1H-dibenzo-[2,3:6,7]thiepino[4,5-c]pyrrol, M.P. 121–123° crystallises out;

(b) 60 g. of carbethoxy - 2,3-dihydro-1H-dibenzo-[2,3:6,7]thiepino[4,5-c]pyrrol are boiled for 6 hours under reflux with a solution of 60 g. of potassium hydroxide in 600 ml. of anhydrous ethanol. The ethanol is then distilled off from the mixture in a rotary evaporator. The residue is mixed with 600 ml. of water and the resulting suspension is extracted with ether. The ethereal solution is washed with water, dried over potassium carbonate and concentrated. The residue is 2,3-dihydro-1H-dibenzo[2,3:6,7]thiepino[4,5-c]pyrrol as crude product. 35 g. of the obtained base are dissolved in 100 ml. of anhydrous acetone and 10.4 g. of methane sulphonic acid is cautiously added, whereupon the methanesulphonate crystallises out, which, after recrystallisation from anhydrous methanol melts at 220–223°.

EXAMPLE 16

Analogously to Example 15(a) and (b) are prepared the following intermediates and end-products respectively: from 13 g. of 2 - allyl - 5-chloro-2,3-dihydro-1H-dibenzo-[2,3:6,7]thiepino[4,5-c]pyrrol and 4,5 g. of ethyl-chloroformate the intermediate 2-carbethoxy-5-chloro-2,3-dihydro - 1H-dibenzo[2,3:6,7]thiepino[4,5-c]pyrrol, M.P. 161–164° (from ethanol) and by subsequent saponification, the end-product, 5 - chloro - 2,3-dihydro-1-dibenzo-[2,3:6,7]thiepino[4,5-c]pyrrol; methane-sulphonate, M.P. 252°–255° (from methanol).

EXAMPLE 17

Analogously to Example 15(a) and (b) are prepared the following intermediate and end-product respectively: from 15 g. of 2-allyl-5-methyl-2,3-dihydro-1H-dibenzo-[2,3:6,7]thiepino[4,5-c]pyrrol and 4.8 g. ethyl-chloroformate the intermediate 2-carbethoxy-5-methyl-2,3-dihydro - 1H-dibenzo[2,3:6,7]thiepino[4,5-c]pyrrol, M.P. 124–126° (from ethanol); and by subsequent saponification, the end-product, 5-methyl-2,3-dihydro-1H-dibenzo-[2,3:6,7]thiepino[4,5-c]pyrrol, M.P. 84–86° (from ethyl acetate); methanesulphonate, M.P. 212–215° (from anhydrous ethanol).

EXAMPLE 18

Analogously to Examples 15(*a*) and (*b*) are prepared the following intermediate and end products, respectively: from 15 g. 2 - allyl - 5-methoxy-2,3-dihydro-1H-dibenzo-[2,3:6,7]thiepino[4,5-c]pyrrol and 5 g. of ethyl-chloroformate the intermediate 2-carbethoxy-5-methoxy-2,3-dihydro - 1H - dibenzo[2,3:6,7]thiepino[4,5-c]pyrrol, M.P. 119–120° (from methanol) and by subsequent saponification, the end product, 5-methoxy-2,3-dihydro-1H-dibenzo-[2,3:6,7]thiepino[4,5-c]pyrrol; hydrochloride, M.P. 271–274° (from ethanol).

The following prescriptions further illustrate the production of tablets, dragées, capsules, suppositories and ampoules:

EXAMPLE 19

250 g. of 2-methyl-2,3-dihydro-1H-dibenzo[2,3:6,7]-thiepino[4,5 - c]pyrrol - methanesulphonate mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in. The mixture is then pressed into 10,000 tablets each weighing 100 mg. and each containing 25 mg. of active substance. Optionally, the tablets can be provided with grooves for finer adjustment of the dosage amount.

EXAMPLE 20

A granulate is produced from 250 g. of 2-ethyl-2,3-dihydro - 1H - dibenzo[2,3:6,7]thiepino[4,5-c]pyrrol-methanesulphonate, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate, and the mixture is pressed into 10,000 dragée cores. These are subsequently coated with a concentrated syrup made from 502.28 g. of crystallised saccharose, 6 g. of shellac, 10 g. of gum arabic, 0.22 g. of dyestuff and 1.5 g. of titanium dioxide, and dried. The obtained dragées each weigh 120 mg. and each contain 25 mg. of active substance.

EXAMPLE 21

To produce 1000 capsules each containing 25 mg. of active substance, 25 g. of 2-methyl-5-methoxy-2,3-dihydro - 1H-dibenzo[2,3:6,7]thiepino[4,5-c]pyrrol-methanesulphonate are mixed with 248 g. of lactose. The mixture is evenly moistened with an aqueous solution of 2 g. of gelatine and is granulated through a suitable sieve (e.g. sieve No. III according to Ph. Helv. V). The granulate is mixed with 10 g. of dried maize starch and 15 g. of talcum. The obtained mixture is uniformly filled into 1000 hard gelatine capsules, size 1.

EXAMPLE 22

A suppository base mixture is prepared from 2.5 g. of 2 - ethyl - 5 - methoxy - 2,3-dihydro-1H-dibenzo[2,3:6,7]-thiepino[4,5-c]pyrrol-methanesulphonate and 167.5 g. of adeps solidus. From this mixture are then filled 100 suppositories each containing 25 mg. of active substance.

EXAMPLE 23

A solution of 25 g. of 2-ethyl-2,3-dihydro-1H-dibenzo-[2,3:6,7]thiepino[4,5-c]pyrrol-methanesulphonate in one litre of water is filled into 1000 ampoules and sterilised. An ampoule contains a 2.5% solution of 25 mg. of active substance.

What we claim is:

1. A compound of the formula

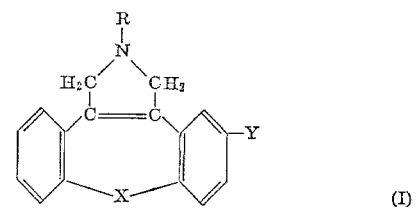

(I)

wherein

X is oxygen or sulfur;

Y is hydrogen, chloro, methyl, methoxy or methylthio; and

R is hydrogen, straight chain lower alkyl having 1 to 6 carbon atoms, isopropyl or allyl;

and the pharmaceutically acceptable acid addition salts thereof.

2. A compound according to claim 1, wherein R is straight chain lower alkyl having 1 to 4 carbon atoms and the pharmaceutically acceptable acid addition salts thereof.

3. A compound according to claim 1, which is 2-methyl - 2,3-dihydro-1H-dibenzo[2,3:6,7]thiepino[4,5-c]pyrrol or a pharmaceutically acceptable acid addition salt thereof.

4. A compound according to claim 1, which is 2-ethyl-2,3 - dihydro - 1H - dibenzo[2,3:6,7]thiepino[4,5-c]pyrrol or a pharmaceutically acceptable acid addition salt thereof.

5. A compound according to claim 1, which is 2-methyl-5 - methoxy - 2,3 - dihydro-1H-dibenzo[2,3:6,7]thiepino-

[4,5-c]pyrrol or a pharmaceutically acceptable acid addition salt thereof.

6. A compound according to claim 1, which is 2-ethyl-5-methoxy-2,3-dihydro-1H-dibenzo[2,3:6,7]thiepino[4,5-c]pyrrol or a pharmaceutically acceptable acid addition salt thereof.

7. A compound according to claim 1, which is 2-ethyl-5-methylthio-2,3-dihydro-1H-dibenzo[2,3:6,7]thiepino[4,5-c]pyrrol or a pharmaceutically acceptable acid addition salt thereof.

References Cited

UNITED STATES PATENTS 3,514,462    5/1970    Hester _____ 260—393

ALEX MAZEL, Primary Examiner

J. A. NARCAVAGE, Assistant Examiner

U.S. Cl. X.R.

260—326.5 B, 326.9, 327 R, 333; 424—274